US008718892B2

(12) United States Patent
Dietzel et al.

(10) Patent No.: US 8,718,892 B2
(45) Date of Patent: May 6, 2014

(54) METHOD FOR CONTROLLING A STARTING AID OF A MOTOR VEHICLE

(75) Inventors: Bernd Dietzel, Syrgenstein (DE); Uli Stark, Gerstetten (DE); Hans Vogel, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/488,007

(22) Filed: Jun. 4, 2012

(65) Prior Publication Data
US 2013/0144499 A1 Jun. 6, 2013

Related U.S. Application Data

(63) Continuation of application No. PCT/EP2011/003701, filed on Jul. 23, 2011.

(30) Foreign Application Priority Data

Aug. 4, 2010 (DE) .......................... 10 2010 033 416

(51) Int. Cl.
*B60T 7/12* (2006.01)
(52) U.S. Cl.
CPC ..................................... *B60T 7/122* (2013.01)
USPC .......................................................... 701/70
(58) Field of Classification Search
CPC ............... B60T 7/122; B60T 2201/06; B60W 30/18118
USPC ............................................ 701/70; 303/191
See application file for complete search history.

(56) References Cited

U.S. PATENT DOCUMENTS

| | | | | |
|---|---|---|---|---|
| 4,644,826 A | * | 2/1987 | Kubo et al. | 477/95 |
| 4,650,046 A | * | 3/1987 | Parsons | 477/194 |
| 4,676,354 A | * | 6/1987 | Janiszewski et al. | 477/92 |
| 4,717,207 A | * | 1/1988 | Kubota et al. | 303/3 |

(Continued)

FOREIGN PATENT DOCUMENTS

| | | |
|---|---|---|
| DE | 36 18 532 A1 | 12/1986 |
| DE | 39 09 907 A1 | 9/1990 |

(Continued)

OTHER PUBLICATIONS

JPO machine translation of JP 2008-1288 (original JP document published Jan. 10, 2008).*

(Continued)

*Primary Examiner* — Behrang Badii
*Assistant Examiner* — David Testardi
(74) *Attorney, Agent, or Firm* — Taylor IP, P.C.

(57) ABSTRACT

The invention concerns a method for controlling a starting aid of a motor vehicle, in particular of a bus. The release of the starting aid takes place as follows: reduction of the braking pressure in accordance with a predetermined first gradient; simultaneous detection of the rotational direction of an output shaft of a transmission of the motor vehicle or of another component which rotates as a function of the rotational speed of the drive wheels; upon detection of a rotational-direction signal which indicates forward travel of the motor vehicle, continuation of the reduction in the braking pressure in accordance with the predetermined first gradient and upon detection of another signal, continuation of the reduction of the braking pressure by way of a second gradient which is reduced in comparison with the first gradient or an increase in the braking pressure.

16 Claims, 1 Drawing Sheet

(56) References Cited

U.S. PATENT DOCUMENTS

| | | | |
|---|---|---|---|
| 5,931,883 A * | 8/1999 | Ghil ................................. | 701/51 |
| 6,510,838 B2 * | 1/2003 | Hur .......................... | 123/339.16 |
| 6,533,081 B2 * | 3/2003 | Totsuka et al. ................ | 188/110 |
| 6,814,414 B1 * | 11/2004 | Schmitt et al. ................. | 303/191 |
| 7,182,412 B2 * | 2/2007 | Ogawa ....................... | 303/113.1 |
| 7,317,980 B2 * | 1/2008 | Aizawa et al. .................. | 701/70 |
| 7,419,455 B2 * | 9/2008 | Hardtle et al. .................. | 477/93 |
| 2007/0233351 A1 | 10/2007 | Wang | |
| 2008/0319624 A1 * | 12/2008 | Aizawa et al. .................. | 701/70 |
| 2010/0036564 A1 * | 2/2010 | Blaise et al. ..................... | 701/42 |
| 2010/0174457 A1 * | 7/2010 | Petzold et al. .................. | 701/51 |
| 2011/0202249 A1 | 8/2011 | Pothin et al. | |

FOREIGN PATENT DOCUMENTS

| | | |
|---|---|---|
| DE | 196 30 870 A1 | 2/1998 |
| DE | 199 12 878 A1 | 4/2000 |
| DE | 199 25 249 A1 | 12/2000 |
| DE | 101 03 713 A1 | 11/2002 |
| DE | 103 03 415 A1 | 8/2004 |
| DE | 10 2004 043 119 A1 | 7/2005 |
| DE | 10 2008 026 530 A1 | 2/2009 |
| EP | 0 812 747 A2 | 12/1997 |
| JP | 2006142902 A * | 6/2006 |
| JP | 2008001288 A * | 1/2008 |

OTHER PUBLICATIONS

English translation of the International Preliminary Report on Patentability and the Written Opinion of the International Searching Authority dated Feb. 5, 2013 for International Application No. PCT/EP0211/003701 (5 pages).
International Search Report dated Nov. 18, 2011 for International Application No. PCT/EP2011/003701 (9 pages).
Infineon Technologies, TLE 4942-TLE 4942C Data Sheet, Differential Two-Wire Hall Effect Sensor IC, Apr. 2001, pp. 1-16.

* cited by examiner

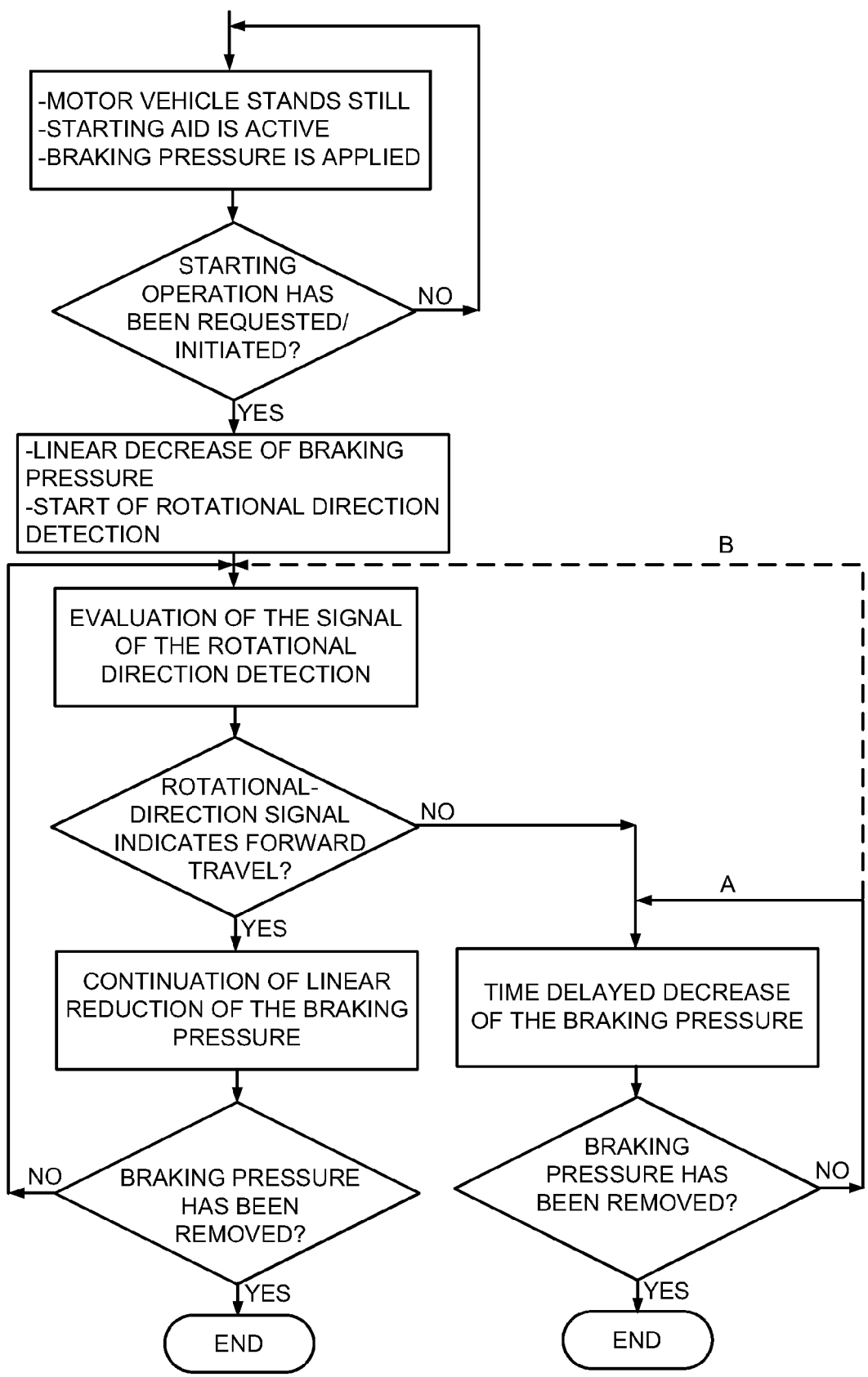

METHOD FOR CONTROLLING A STARTING AID OF A MOTOR VEHICLE

CROSS REFERENCE TO RELATED APPLICATIONS

This is a continuation of PCT application No. PCT/EP2011/003701, entitled "METHOD FOR CONTROLLING A STARTING AID OF A MOTOR VEHICLE", filed Jul. 23, 2011, which is incorporated herein by reference.

BACKGROUND OF THE INVENTION

1. Field of the Invention

The present invention concerns a method for controlling a starting aid of a motor vehicle, in particular of a bus, in detail with the following steps: holding of the motor vehicle by means of a braking force by application of a braking pressure to a brake of the starting aid; release of the starting aid by reducing the braking pressure as a reaction to the detection of a starting operation which is initiated by the driver.

2. Description of the Related Art

A large number of methods for controlling a starting aid of a motor vehicle are known, dealing in particular, as in the present invention, with the completion or the release of the starting aid by reducing the braking pressure during a starting operation. The release of the starting aid can then take place in such a way that the motor vehicle cannot roll backwards on an uphill grade. This is a tricky problem since the grade resistance moment acting upon the motor vehicle to make it roll backwards changes with the angle of the grade and the weight of the motor vehicle due to different loading conditions. This problem can only be solved easily when the release of the starting aid, i.e. the decrease in the braking pressure, takes place slowly in such a way that in the worst case, that is to say at maximum load of the motor vehicle and at maximum grade, said vehicle will not roll backwards. The braking torque can hence decrease according to the drive torque of the drive motor.

The shortcoming of such a simple method is however that the release of the starting aid or the reduction in the braking pressure then takes place slowly accordingly when there is no danger of the vehicle rolling backwards, for instance when starting on a flat road or on a downhill grade. The driver of the motor vehicle experiences the decelerated start as a comfort loss since the vehicle "remains stuck". Moreover, the fuel consumption is increased unnecessarily.

To reduce the braking pressure according to the grade actually prevailing during a starting operation, most known control methods set forth to determine the grade by detecting the inclination angle and to reduce the braking pressure according to the detected grade. Such a detection of the inclination angle or grade is described for instance in the publications DE 103 03 415 A1, DE 101 03 713 A1, DE 199 12 878 A1, DE 36 18 532 A1, EP 0 812 747 A2 and DE 196 30 870 A1. Different chronological sequences of the reduction in the braking torque are provided in detail according to the detected inclination angle. Document DE 36 18 532 A1 suggests moreover to provide a switch on a rotatable portion of a brake, whereas its switching mode changes depending on the conditions of the roadway, that is to say going uphill or going downhill. The system determines whether the switching mode of the switch has changed and only then generates a switch-off signal for the starting aid, once the switching mode has changed as requested. Although this method offers comparatively high safety against rolling backwards, the drive comfort is decreased in such a way that the motor vehicle so to say "remains stuck" on the road during the starting operation, namely as long as the change in the switching mode of the switch has not taken place yet. After remaining stuck, the vehicle starts jerkily due to the already comparatively high drive torque during the state change of the switch. The construction effort is moreover high and the system is error-prone due to the mechanical switch. A failure of the switch makes the vehicle undriveable, or, if the switch can be bypassed in case of malfunction, no starting aid is available any longer.

The object of the present invention, and what is needed in the art, is to provide a method for controlling a starting aid of a motor vehicle, in particular of a bus, with which said vehicle is safely prevented from rolling backwards in a permissible area, the drive comfort is increased and a starting aid can further be made available in case of malfunction. The method should be characterised by simple implementability in the motor vehicle and high operating reliability.

SUMMARY OF THE INVENTION

The object of the invention is satisfied by, and the present invention provides, a method for controlling a starting aid of a motor vehicle, in particular of a bus, with the following steps: (1.1) holding of the motor vehicle by means of a braking force by application of a braking pressure to a brake of the starting aid; (1.2) release of the starting aid by reducing the braking pressure as a reaction to the detection of a starting operation which is initiated by the driver; characterized in that (1.3) the release of the starting aid takes place as follows: (1.3.1) reduction of the braking pressure in accordance with a predetermined first gradient; (1.3.2) simultaneous detection of the rotational direction of an output shaft of a transmission of the motor vehicle or of another component which rotates as a function of the rotational speed of the drive wheels; (1.3.3) upon detection of a rotational-direction signal, which indicates forward travel of the motor vehicle, continuation of the reduction of the braking pressure in accordance with the predetermined first gradient and upon detection of another signal, continuation of the reduction in the braking pressure by way of a second gradient which is reduced in comparison with the first gradient or an increase in the braking pressure.

The method according to the invention sets forth that in case of an active starting aid, the motor vehicle is stopped by means of braking force by application of a braking pressure to a brake of the starting aid. Such an activation of the starting aid or complete holding of the motor vehicle can for instance always be triggered once the driver has braked the motor vehicle down to zero speed, in particular by means of a service brake which is operated by a foot pedal, regardless of whether he releases the brake pedal subsequently or releases the service brake. The starting aid can be released by reducing the braking pressure as a reaction to the detection of a starting operation which is initiated by the driver, for instance when the driver actuates the accelerator.

According to the invention, the release of the starting aid takes place as follows: The braking pressure is reduced in accordance with a predetermined first gradient. Said reduction starts in particular immediately after initiating the starting operation of the driver, notably after pressing the accelerator.

Simultaneously, the rotational direction of an output shaft of a transmission of the motor vehicle or of another component which rotates as a function of the rotational speed of the drive wheels is detected or said detection is initiated. As soon as the result of the detection of the rotational direction is available, in particular after elapse of a period of time after the start of the reduction in the braking pressure in accordance with the predetermined first gradient, said result is interpreted and, when a rotational-direction signal which indicates forward travel of the motor vehicle has been detected, the braking pressure is further reduced in accordance with the predetermined first gradient. If conversely another signal has been detected than a rotational-direction signal which indicates forward travel of the motor vehicle, the reduction in the braking pressure is continued by way of a second gradient which is reduced in comparison with the first gradient or the braking pressure is increased. In the latter case, either the release of the starting aid according to the steps indicated previously can be started again or the braking pressure can be increased first of all and reduced subsequently in accordance with a gradient deviating from the first gradient, in particular the gradient which is reduced in comparison with the first gradient.

According to an embodiment of the method according to the invention, the reduction in the braking pressure according to the first gradient takes place linearly with time. Moreover, according to an embodiment, the reduction in the braking pressure can take place non-linearly or also linearly, however less steeply according to the second gradient.

The rotational direction can be detected by means of a sensor, in particular a Hall sensor which for instance can be designed as a differential Hall sensor, whose output signals contain information on the rotational speed and on the rotational direction. For instance, the frequency of the output pulses of the sensor can describe the sensed rotational speed. The length of the pulses can inform on whether a pure speed signal, the rotational-direction signal "left", or the rotational-direction signal "right" is available, whereas accordingly one of the two rotational-direction signals is mapped to the forward travel and the other of the two rotational-direction signals is mapped to the backward travel. Advantageously, the length of the pulses which indicate backward travel of the motor vehicle should be shorter than the length of the pulses which indicate forward travel of the motor vehicle. It may thus be considered that the sensor pulses can be shortened due to ageing phenomena. The selection aforementioned guarantees that in case of failure (shortening of a pulse) the reduction in the braking pressure is performed more reliably according to the comparatively reduced gradient or the fast reduction is not performed or is continued according to the first gradient.

The sensor for detecting the rotational direction can be designed in such a way that it provides a pure speed signal as the first pulse after the transition between standstill and rotation. This pulse as well as the following pulse having information on the rotation direction can in particular be generated in an uncalibrated mode, through which the information on the rotation direction is only correct at the third pulse. A dead phase can thus be obtained first of all when detecting the rotational direction, inside which the braking pressure is reduced in accordance with the predetermined first gradient. The length of the dead phase and the selection of the first gradient define the maximum possible roll-back distance of the motor vehicle which should lie in the admissible range.

The other signal which may be generated by the sensor, that is to say the signal which is applied in the absence of a rotational-direction signal which indicates forward travel of the motor vehicle, can be for instance a rotational-direction signal which indicates backward travel of the motor vehicle, a rotational-direction signal which indicates standstill of the motor vehicle, and/or a pure rotational speed signal. It is further possible to provide timeout monitoring, that is to say to check whether no signal is (still) applied after a preset period of time has elapsed once reduction in the braking pressure has started, and in such a case to decelerate the reduction in the braking pressure according to the second gradient or to continue it according to a higher pressure ramp.

An embodiment according to the invention sets forth that also after detecting the rotational-direction signal which indicates forward travel of the motor vehicle, the rotational direction is further detected and with a subsequent detection of a rotational-direction signal which indicates backward travel of the motor vehicle, the braking pressure is increased or the reduction is continued in accordance with the second or a third gradient, which is decreased with respect to the second gradient. For instance, the braking pressure can also be first of all increased abruptly then reduced starting from the increased value in accordance with a gradient which in particular corresponds to the first, second or third gradient.

It is advantageous when the method according to the invention has two operating modes, that is to say a safety mode and a comfort mode. In comfort mode, the braking pressure is reduced in accordance with the predetermined first gradient when releasing the starting aid, in particular immediately after detecting the initiation of the starting operation, together with the detection or the beginning of the detection of the rotational direction of the output shaft or of the other component which rotates according to the rotational speed of the drive wheels. In safety mode, the starting aid is released, in particular immediately after detecting the initiated starting operation, by reducing the braking pressure according to the preset second gradient or another gradient which is reduced in comparison with the first gradient. To do so, according to an embodiment, the comfort mode can only be switched on once the signals generated by the sensor have been checked for plausibility. Changeover to the safety mode can for instance be initiated once the plausibility check has produced a negative result, when a defect has been detected, in case of failure of the sensor or of failed detection.

The plausibility check of the signals generated by the sensor can for instance be performed in such a way that during deceleration of the motor vehicle before or until stopping said motor vehicle by means of braking force by Application of the braking pressure, the signals generated by the sensor are checked for the presence of rotational-direction signals which indicate forward travel of the motor vehicle, and the reduction in the braking pressure according to the first gradient when releasing the starting aid, that is to say changeover into comfort mode, only takes place once rotational-direction signals which indicate forward travel have been detected during deceleration, and otherwise the reduction in the braking pressure when releasing the starting aid takes place right away in accordance with the second or another gradient which is reduced in comparison with the first gradient, that is to say when switching to safety mode. A deceleration or stop of the motor vehicle can be detected for instance by the sequence of gears of a shift gearbox in the motor vehicle drive train, whereas by shift gearbox are also meant automatic transmissions or automated shift gearboxes, whereas said detection may encompass the sequence second gear, first gear, standstill or only first gear, standstill. Only if the sensor delivers correct "forward" pulses in this sequence, the comfort function is used during subsequent start or the comfort mode is initiated.

If the sensor delivers a signal for which the frequency of the pulses indicates the rotational speed, the detected rotational speed can be compared with a limit value during the starting operation and in case when the limit value has been exceeded, a malfunction can be suggested, with the consequence that the reduction in the braking pressure is slowed down or the braking pressure, as represented, is increased or still to change over to safety mode. If it appears conversely that a correct signal has been generated the starting aid can thus be switched off due to the high rotational speed.

It is provided according to an embodiment that the signals generated by the sensor are checked for plausibility in such a way that the calculated rotational speed is compared with the engine speed detected by means of another sensor or a calculated engine speed, which can normally be found on the CAN bus, possibly while taking into account the gear engaged in the vehicle transmission.

If in addition to the rotational-direction signal a rotational speed signal is detected, in particular by means of the sensor above mentioned, the rotational speed can be interpreted according to an embodiment of the invention and the braking pressure can be changed according to the detected rotational speed, in particular reduced when forward travel has been detected. If the rotational-direction signal conversely indicates backward travel of the motor vehicle, the braking pressure can in particular be increased according to the detected rotational speed or the gradient of the reduction can be decreased according to the detected rotational speed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

The sole FIGURE shows a flow chart which depicts the main steps of an embodiment of the present invention.

The exemplification set out herein illustrates one embodiment of the invention, and such exemplification is not to be construed as limiting the scope of the invention in any manner.

DETAILED DESCRIPTION OF THE INVENTION

The sole FIGURE represents a flow chart which depicts the main steps of an embodiment of the invention. The method hence starts from the condition that the vehicle stands still, the starting aid is active, and braking pressure is applied, in particular the maximum braking pressure. It is now checked whether a starting operation has been requested for or initiated. If answered with no, the braking pressure is not reduced, but further maintained. If confirmed yes, the braking pressure is decreased linearly and the detection of the rotational direction is started.

After a preset period of time has elapsed, in particular after a predetermined number of pulses generated by the sensor which detects the rotational direction, for instance as of the third pulse, the evaluation of the signal derived from the detection of the rotational direction, or of the sensor, is initiated. If the rotational-direction signal indicates forward travel, the braking pressure is further reduced linearly. If conversely a rotational-direction signal which indicates forward travel has not been detected, the decrease in the braking pressure is continued with a time delay.

Also the rotational direction detection signals are further detected and interpreted in case of a continued linear decrease in the braking pressure and the linear decrease is continued as long as the rotational-direction signal indicates forward travel, until the braking pressure has been removed completely. The starting aid can subsequently be deactivated.

If conversely a time delayed decrease in the braking pressure due to the detection of another signal has been set, the time delayed decrease in the braking torque can be continued in particular with the same gradient according to a first embodiment (designated with A) until the braking pressure has been removed, or according to a second embodiment (designated with B), the rotational direction detection signal is further interpreted, and if a rotational-direction signal which indicates forward travel has been detected, the braking pressure is further reduced linearly, including the additional steps, as described above for the linear decrease in the braking pressure.

The method according to the invention allows for more reliable roll-back prevention and simultaneously a comfortable start, with a minimal amount of construction and technological effort, and high failure safety. The brake of the starting aid can be for instance the service brake of the vehicle, the so-called frequent stop brake in case of (urban) busses, which only act upon the rear axle usually, multiple disk brakes or multiple disk clutches of an automatic transmission, whose appropriate actuation enables blocking or holding the output.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a starting aid of a motor vehicle, said method comprising the steps of:
    holding the motor vehicle by way of a braking force by applying a braking pressure to a brake of the starting aid;
    releasing the starting aid by reducing said braking pressure as a reaction to detecting a starting operation which is initiated by a driver of the motor vehicle, said step of releasing the starting aid including:
    reducing said braking pressure in accordance with a predetermined first gradient;
    detecting simultaneously a rotational direction of one of an output shaft of a transmission of the motor vehicle and another component which rotates as a function of a rotational speed of a plurality of drive wheels;
    upon detecting a rotational direction signal which indicates a forward travel of the motor vehicle, continuing the reduction of said braking pressure in accordance with said predetermined first gradient, and, upon detecting another signal, responsively continuing said reduction in said braking pressure by way of a second gradient which is reduced in comparison with said predetermined first gradient.

2. The method according to claim 1, wherein the motor vehicle is a bus.

3. The method according to claim 1, wherein said reduction in said braking pressure in accordance with said predetermined first gradient includes a linear reduction with time.

4. The method according to claim 1, wherein said reduction in said braking pressure with said second gradient can be one of linear and non-linear.

5. The method according to claim 1, wherein, for detecting said rotational direction, a sensor is used which generates said rotational direction signal and a rotational speed signal.

6. The method according to claim 5, wherein said sensor is a Hall sensor.

7. The method according to claim 5, wherein said sensor generates a plurality of electrical pulses, a frequency of said plurality of electrical pulses indicating said rotational speed, a length of said plurality of electrical pulses indicating said rotational direction.

8. The method according to claim 7, wherein said length of said plurality of electrical pulses indicates respectively one of a backward travel of the motor vehicle and said forward travel of the motor vehicle, said length of said plurality of electrical pulses which indicates a backward travel of the motor vehicle being shorter than said length of said plurality of electrical pulses which indicates said forward travel of the motor vehicle.

9. The method according to claim 5, wherein a plurality of signals generated by said sensor are checked for plausibility in such a way that during a deceleration of the motor vehicle one of before and until stopping the motor vehicle by way of said braking force by applying said braking pressure said plurality of signals generated by said sensor are checked for a presence of a plurality of said rotational direction signal which indicate said forward travel of the motor vehicle, and said reduction in said braking pressure according to said first gradient when releasing the starting aid only takes place if a plurality of said rotational speed signal which indicated said forward travel were detected during said deceleration, and otherwise said reduction in said braking pressure when releasing the starting aid takes place right away in accordance with one of said second gradient and another gradient which is reduced in comparison with said first gradient.

10. The method according to claim 5, wherein, when said rotational direction signal is detected which indicates a backward travel, a gradient of said reduction is decreased according to a detected rotational speed.

11. The method according to claim 1, wherein said other signal includes at least one of:
a rotational speed signal which indicates a backward travel of the motor vehicle;
a rotational speed signal which indicates a standstill of the motor vehicle;
no signal after a preset period of time has elapsed once said reduction in said braking pressure has started; and
a pure rotational speed signal.

12. The method according to claim 1, wherein, after detecting said rotational direction signal which indicates said forward travel of the motor vehicle, said rotational direction is further detected, and, with a subsequent detection of a signal which indicates a backward travel of the motor vehicle, said reduction in said braking pressure is continued in accordance with one of said second gradient and a third gradient which is reduced with respect to said second gradient.

13. The method according to claim 12, wherein, when detecting a rotational speed signal which indicates said backward travel of the motor vehicle, once a rotational speed signal, which indicates said forward travel of the motor vehicle, has been detected previously during a same said starting operation said braking pressure is first of all increased abruptly and then is reduced starting from an increased value in accordance with a gradient.

14. The method according to claim 13, wherein said gradient corresponds to one of said first gradient, said second gradient, and said third gradient.

15. The method according to claim 1, wherein one of (a) a service brake of the motor vehicle which only acts upon a rear axle of the motor vehicle, and (b) one of a plurality of disk brakes or a plurality of multiple disk clutches of an automatic transmission by way of which a power take-off is blocked is used as a brake.

16. The method according to claim 15, wherein said service brake is a frequent stop brake and the motor vehicle is a bus.

\* \* \* \* \*